(12) United States Patent
Kobayashi

(10) Patent No.: US 10,272,761 B2
(45) Date of Patent: Apr. 30, 2019

(54) BATTERY PACK

(71) Applicant: TOYOTA JIDOSHA KABUSHIKI KAISHA, Toyota-shi, Aichi-ken (JP)

(72) Inventor: Takenori Kobayashi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/856,827

(22) Filed: Dec. 28, 2017

(65) Prior Publication Data

US 2018/0194213 A1 Jul. 12, 2018

(30) Foreign Application Priority Data

Jan. 11, 2017 (JP) ................. 2017-002614

(51) Int. Cl.
*B60K 1/04* (2006.01)
*B60L 11/18* (2006.01)
*H01M 2/10* (2006.01)

(52) U.S. Cl.
CPC ............ *B60K 1/04* (2013.01); *B60L 11/1822* (2013.01); *B60L 11/1877* (2013.01); *H01M 2/1077* (2013.01); *H01M 2/1083* (2013.01); *B60K 2001/0416* (2013.01); *B60K 2001/0466* (2013.01); *B60K 2001/0477* (2013.01); *B60Y 2306/01* (2013.01); *H01M 2220/20* (2013.01)

(58) Field of Classification Search
CPC .............. B60K 1/04; B60K 2001/0416; B60K 2001/0466; B60K 2001/0477; B60L 11/1822; B60L 11/1877; H01M 2/1077; H01M 2/1083; H01M 2220/20; B60Y 2306/01
USPC ........................................................ 180/68.5
See application file for complete search history.

(56) References Cited

U.S. PATENT DOCUMENTS

| | | | | |
|---|---|---|---|---|
| 8,051,934 B2* | 11/2011 | Kiya | ................... | B60K 1/04 180/274 |
| 8,465,866 B2* | 6/2013 | Kim | ................... | H01M 2/1077 429/149 |
| 8,839,895 B2* | 9/2014 | Kato | ................... | B60K 1/04 180/68.5 |
| 9,799,872 B2* | 10/2017 | Kim | ................... | H01M 2/206 |

FOREIGN PATENT DOCUMENTS

JP 2007-273180 A 10/2007

* cited by examiner

*Primary Examiner* — John D Walters
(74) *Attorney, Agent, or Firm* — Sughrue Mion, PLLC

(57) ABSTRACT

Disclosed is a battery pack that is mountable in a vehicle. The battery pack includes a plurality of battery modules, and a battery case that accommodates the battery modules. The battery case includes a first frame, a second frame provided across the battery modules from the first frame, and a connection portion that connects the first frame and the second frame. The second frame is provided with a protrusion that protrudes in a direction from the first frame toward the second frame.

5 Claims, 6 Drawing Sheets

BATTERY PACK

INCORPORATION BY REFERENCE

The disclosure of Japanese Patent Application No. 2017-002614 filed on Jan. 11, 2017 including the specification, drawings and abstract is incorporated herein by reference in its entirety.

BACKGROUND

1. Technical Field

The present disclosure relates to a battery pack, and more specifically, to a battery pack that is mountable in a vehicle.

2. Description of Related Art

In general, a battery pack that is mounted in a vehicle includes a plurality of battery modules. Since there is a possibility that impact energy is applied to the battery pack at the time of vehicle collision, a configuration for protecting the battery modules in the battery pack from impact energy has been suggested. For example, a battery pack disclosed in Japanese Unexamined Patent Application Publication No. 2007-273180 (JP 2007-273180 A) is provided with an elastic spring that is elastically deformed with impact energy to absorb impact energy.

In the battery pack disclosed in JP 2007-273180 A, elastic springs are provided on the entire circumference (four surfaces) of a substantially rectangular parallelepiped battery case that accommodates the battery modules so as to absorb impact energy from all directions of front, rear, right, and left. However, since the elastic springs and the battery case are in contact with each other, impact energy is transmitted to the battery modules through the elastic springs and the battery case, and there is a possibility that the battery modules cannot be appropriately protected from impact energy.

SUMMARY

The present disclosure provides a technique capable of more reliably protecting battery modules from impact energy in a battery pack that is mounted in a vehicle.

An aspect of the present disclosure relates to a battery pack that is mountable in a vehicle. The battery pack includes a plurality of battery modules, and a battery case that accommodates the battery modules. The battery case includes a first frame (for example, a front frame), a second frame (for example, a rear frame) provided across the battery modules from the first frame, and a connection portion that connects the first frame and the second frame. The second frame is provided with a protrusion that protrude in a direction from the first frame toward the second frame.

According to the aspect of the present disclosure, in a case where a constituent part of the vehicle is physically deformed due to impact energy from a second frame side (for example, the rear side of the vehicle) and comes into contact with the battery pack, the protrusion that protrudes from the second frame first come into contact with the battery pack. For this reason, the protrusion function as a crushable zone locally formed in the battery pack to absorb impact energy. In addition, since impact energy not completely absorbed among impact energy received by the protrusion is transmitted from the second frame toward the first frame (for example, from the vehicle rear side toward the vehicle front side) through the connection portion, transmission of impact energy to the battery modules inside the battery case is suppressed. With this, since it is possible to prevent damage to structures inside the battery case, it is possible to more reliably protect the battery modules.

In the battery pack according to the aspect of the present disclosure, the protrusion may be provided in a lower portion of the battery case. The battery case may further include a fixing portion configured to fix the battery case to a body of the vehicle in the lower portion of the battery case.

According to the aspect of the present disclosure, the battery pack is fixed to the body in the lower portion of the battery pack, and the protrusion is provided in the lower portion of the battery pack. That is, both of fixing of the battery pack and absorption of impact energy are performed in the lower portion of the battery pack. In this way, the distance between the fixing portion and the protrusion is shortened, whereby a moment for causing distortion of the battery case at the time of application of impact energy is reduced and distortion of the battery case hardly occurs, for example, compared to a case where fixing of the battery pack is performed in an upper portion of the battery pack. Therefore, it is possible to more reliably protect the battery modules.

In the battery pack according to the aspect of the present disclosure, the fixing portion may include a flange that extends in a direction from the first frame toward the second frame in a lower portion of the second frame of the battery case. A lower end of the protrusion may be connected to the flange.

In the battery pack according to the aspect of the present disclosure, in a state in which the battery pack is mounted on a rear side of the vehicle such that the first frame is disposed in front of the second frame in a front-rear direction of the vehicle, the first frame may include a front fixing portion disposed on a vehicle front side of the battery case and a rear fixing portion disposed on a vehicle rear side of the battery case. The front fixing portion may be provided with a plurality of front through-holes for fastening the battery case to the body with bolts. The rear fixing portion may be provided with a plurality of rear through-holes for fastening the battery case to the body with bolts. The number of through-holes of the front fixing portion may be greater than the number of through-holes of the rear fixing portion of the vehicle.

According to the aspect of the present disclosure, it is possible to secure a space for providing the protrusions on the rear side of the vehicle in preparation for impact energy from the vehicle rear side by making the number of rear through-holes provided on the rear side of the vehicle smaller, while firmly fastening the battery case to the body by making the number of front through-holes formed on the front side of the vehicle greater.

In the battery pack according to the aspect of the present disclosure, the protrusion and the connection portion may be provided to be connected to each other on the same horizontal plane.

According to the aspect of the present disclosure, since the protrusion and the connection portion are directly connected to each other on the same horizontal plane, it is possible to make impact energy received by the protrusion be more efficiently transmitted to the connection portions.

In the battery pack according to the aspect of the present disclosure, the battery case may further include a pair of side frames interposed between both end portions of the first frame and both end portions of the second frame. The connection portion may be disposed outside the side frames.

According to the aspect of the present disclosure, in a battery pack that is mountable in a vehicle, it is possible to more reliably protect battery modules from impact energy.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
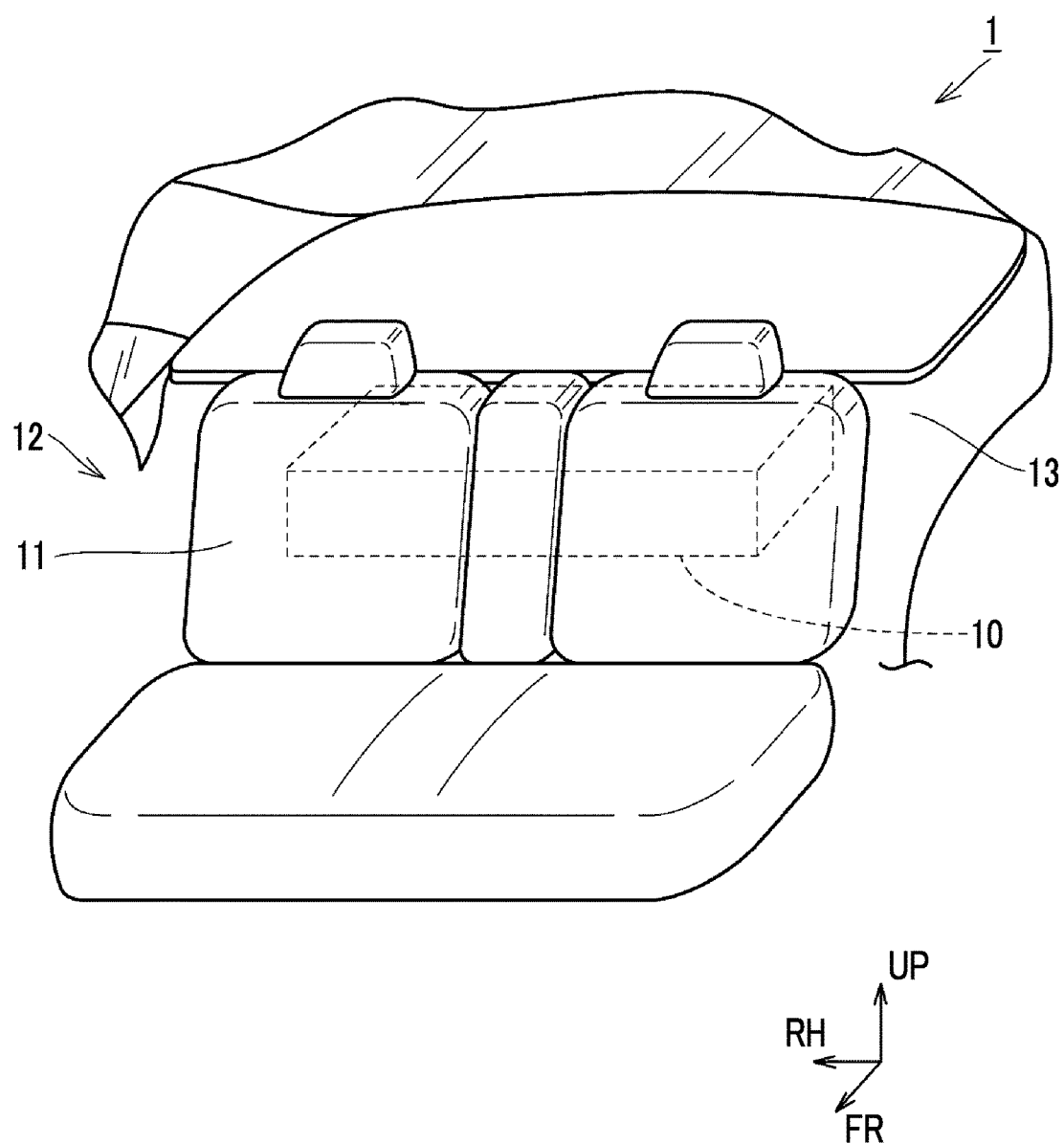
FIG. 1 is a diagram showing the configuration of a vehicle in which a battery pack according to an embodiment is mounted.

Hereinafter, an embodiment of the present disclosure will be described in detail referring to the drawings. The same or similar portions in the drawings are represented by the same reference numerals, and description thereof will not be repeated.

FIG. 1 is a diagram showing the configuration of a vehicle in which a battery pack according to the embodiment is mounted. A vehicle 1 is an electrically powered vehicle in which a battery pack 10 (indicated by a broken line in FIG. 1) is mounted. The electrically powered vehicle means a hybrid vehicle (including a plug-in hybrid vehicle), an electric vehicle, or a fuel cell vehicle.

In the following description, the front side of the vehicle 1 is referred to as an FR direction, a width direction of the vehicle 1 (a right direction when facing the front side of the vehicle 1) is referred to as an RH direction, and a height direction of the vehicle 1 is referred to as an UP direction. In FIG. 1, although a perspective view of the vicinity of a rear seat 11 of a so-called sedan type electrically powered vehicle is shown, the shape of a vehicle body (body) of the vehicle 1 is not particularly limited.

The battery pack 10 is mounted on the rear side of the vehicle 1. In the example shown in FIG. 1, an example where the battery pack 10 is disposed below a luggage room 13 that is provided behind a vehicle cabin 12 is shown. However, a mounting position of the battery pack 10 may be set such that at least a part of the battery pack 10 is on the rear side of the vehicle 1 (behind a division line (not shown) that divides the vehicle 1 into two parts in a front-rear direction). For this reason, for example, the battery pack may be mounted outside the vehicle cabin (for example, below a floor panel).

Figure 2:
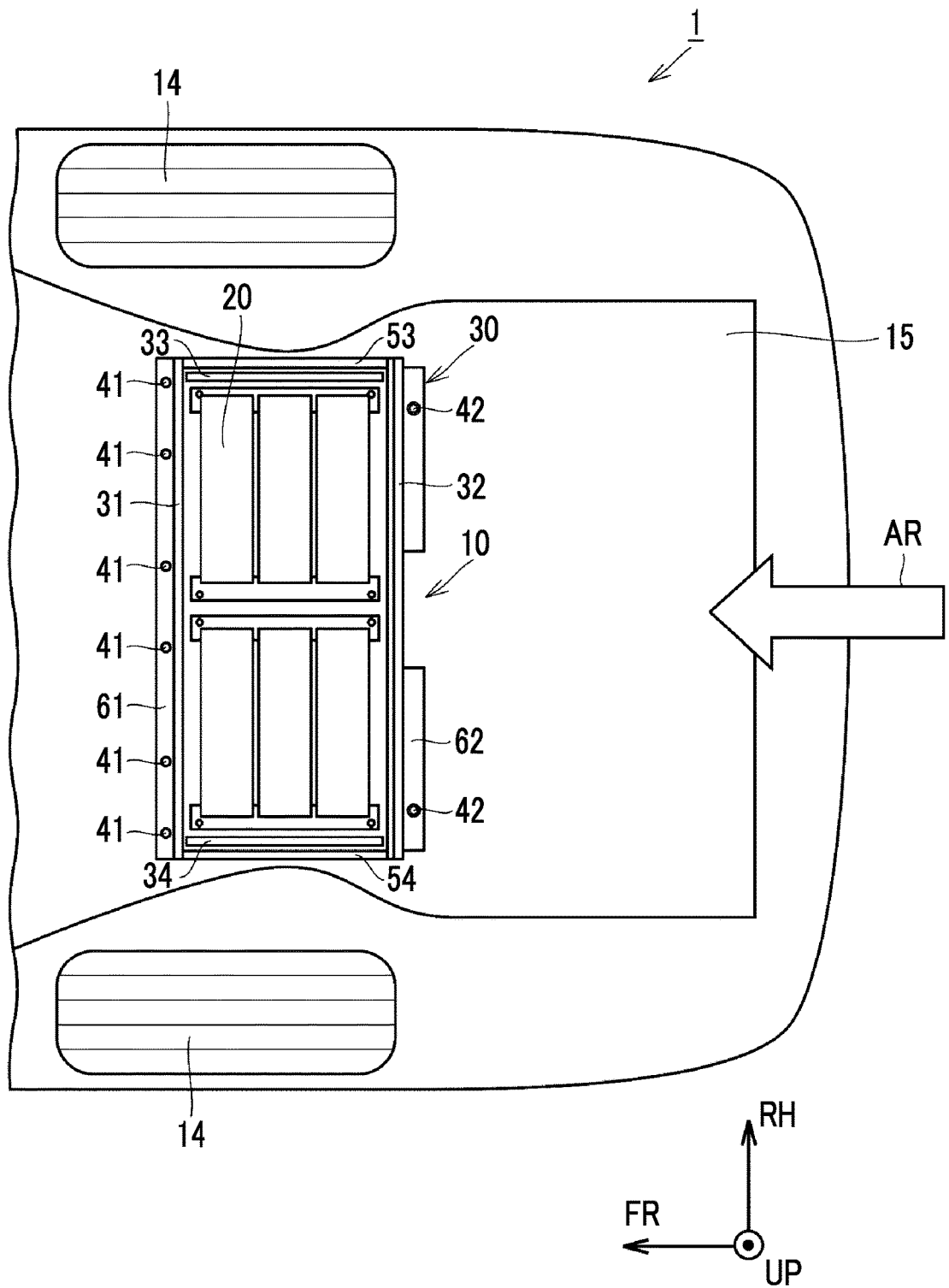
FIG. 2 is a diagram of a mounting position of the battery pack shown in FIG. 1 viewed from an upper surface of the vehicle.

FIG. 2 is a diagram of a mounting position of the battery pack 10 shown in FIG. 1 viewed from an upper surface of the vehicle. In FIG. 1, the battery pack 10 mounted between rear wheels 14 is shown. In FIG. 2, in order to prevent the drawings from being complicated, the rear seat 11 (see FIG. 1) is not shown.

The battery pack 10 includes a plurality of (in the example of FIG. 2, six) battery modules 20, and a battery case (housing) 30 that accommodates the battery modules 20.

The battery modules 20 are connected by a wire harness (not shown). The battery modules 20 include a plurality of cells connected in series or in parallel with one another. Each cell is a secondary battery, such as a lithium-ion secondary battery or a nickel-hydrogen battery.

The battery case 30 is a substantially rectangular parallelepiped frame formed of aluminum, and includes a front frame 31, a rear frame 32, a side frame (right side frame) 33, and a side frame (left side frame) 34. A material of each frame can be appropriately selected, and may be, for example, iron. The front frame 31 is an example of a "first frame" according to the present disclosure, and the rear frame 32 is an example of a "second frame" according to the present disclosure.

The vehicle 1 is provided with a floor panel 15 that constitutes a part of the body and that is formed in a plate shape so as to support the battery case 30. Mounts 161, 162 (see FIG. 3) are fixed to the floor panel 15. The front frame 31 (in more detail, a flange 61 described below) of the battery case 30 is fastened to the mount 161 by a plurality of bolts 41. The rear frame 32 (in more detail, flange 62 described below) is fastened to the mount 162 by a plurality of bolts 42.

In a case where the vehicle 1 collides with another vehicle or the like, there is a possibility that impact energy (compressive load) is applied to the battery pack 10. Specifically, since the battery case 30 is deformed due to impact energy, interference of the battery case 30 and the battery modules 20 may occur. Alternatively, there is a possibility that interference of the wire harness (not shown) connecting the battery modules 20 and the battery case 30 occurs. In order to prevent the occurrence of such damage, there is a demand for protecting the structures (the battery modules 20, the wire harness, and the like) inside the battery case 30 from impact energy.

As described above, the battery pack 10 is mounted on the rear side of the vehicle 1. For this reason, impact energy from the front side of the vehicle 1 is absorbed by a front compartment (not shown) of the vehicle 1 that functions as a so-called crushable zone. Thus, impact energy from the front side of the vehicle 1 is hardly transmitted directly to the battery pack 10. Meanwhile, behind the battery pack 10 (on the rear side of the vehicle 1), there is no zone (or there is merely an insufficient zone) capable of absorbing impact energy like the front compartment.

Accordingly, in the embodiment, impact energy (see an arrow AR) from the rear side of the vehicle 1 is assumed, and a configuration for receiving impact energy from the rear side of the vehicle 1 and transmitting impact energy to the front side of the vehicle body is provided, thereby protecting the structures inside the battery case 30. The above-described configuration will be described in detail referring to FIGS. 3 to 6.

Figure 3:
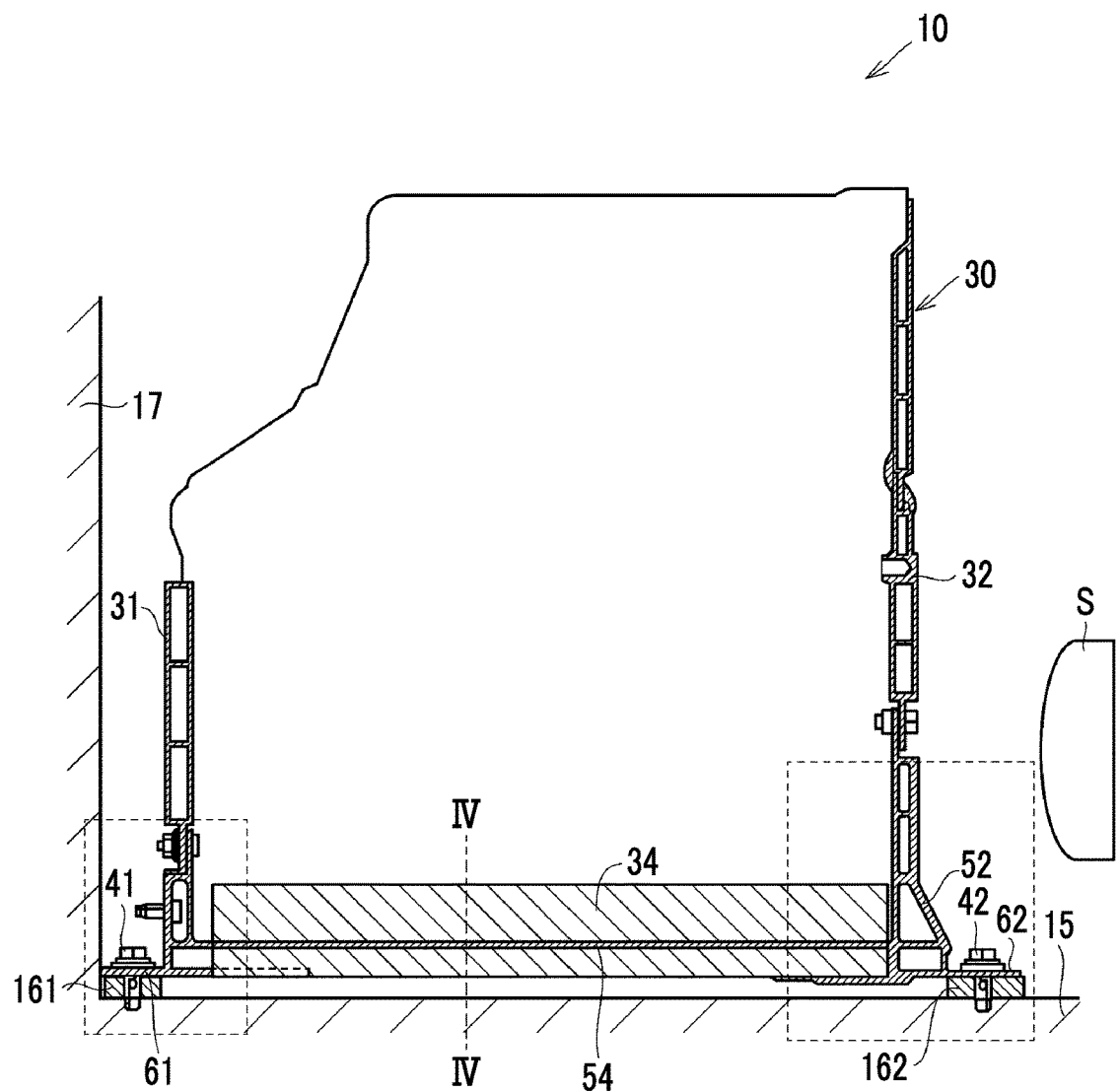
FIG. 3 is a diagram of the battery pack according to the embodiment viewed from a left side surface.
Figure 4:
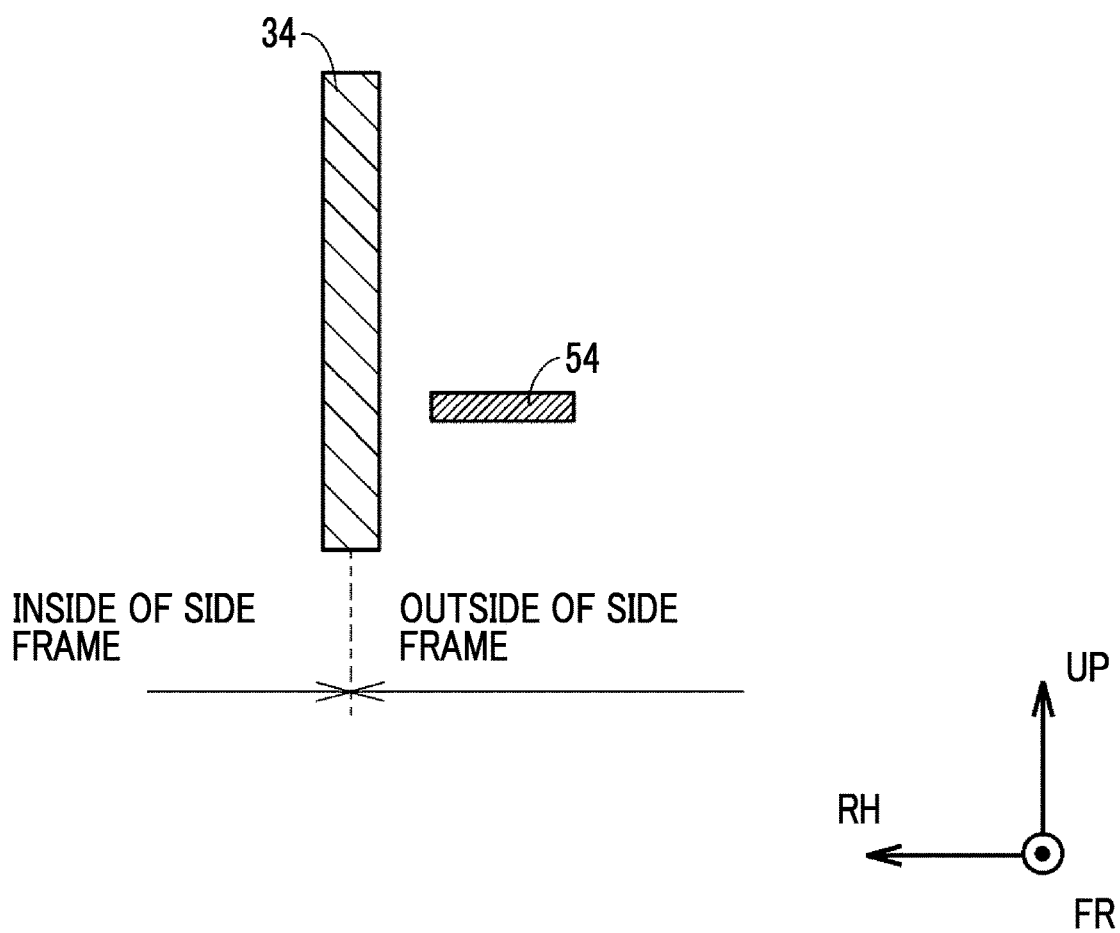
FIG. 4 is a sectional view of a battery case taken along line IV-IV shown in FIG. 3.

FIG. 3 is a diagram of the battery pack 10 according to the embodiment viewed from a left side surface. FIG. 4 is a sectional view of the battery case 30 taken along line IV-IV shown in FIG. 3. Referring to FIGS. 2 to 4, an extension portion 54 that extends in the front-rear direction of the vehicle 1 is provided near the left side frame 34 of the battery case 30. The extension portion 54 connects the front frame 31 and the rear frame 32.

In FIGS. 3 and 4, although the configuration of the left side frame 34 of the battery case 30 is merely shown, an extension portion 53 that extends in the front-rear direction of the vehicle 1 is provided similarly for the right side frame 33. The extension portion 53 connects the front frame 31 and the rear frame 32. The battery modules 20 (see FIG. 2) are disposed between the extension portion 53 and the extension portion 54 (see FIG. 2).

Although an example where the extension portion 54 and the left side frame 34 are formed separately has been shown, the extension portion 54 and the left side frame 34 may be formed integrally. The same applies to the extension portion 53 and the right side frame 33. The extension portions 53, 54 are an example of "connection portions" according to the present disclosure.

Figure 5:
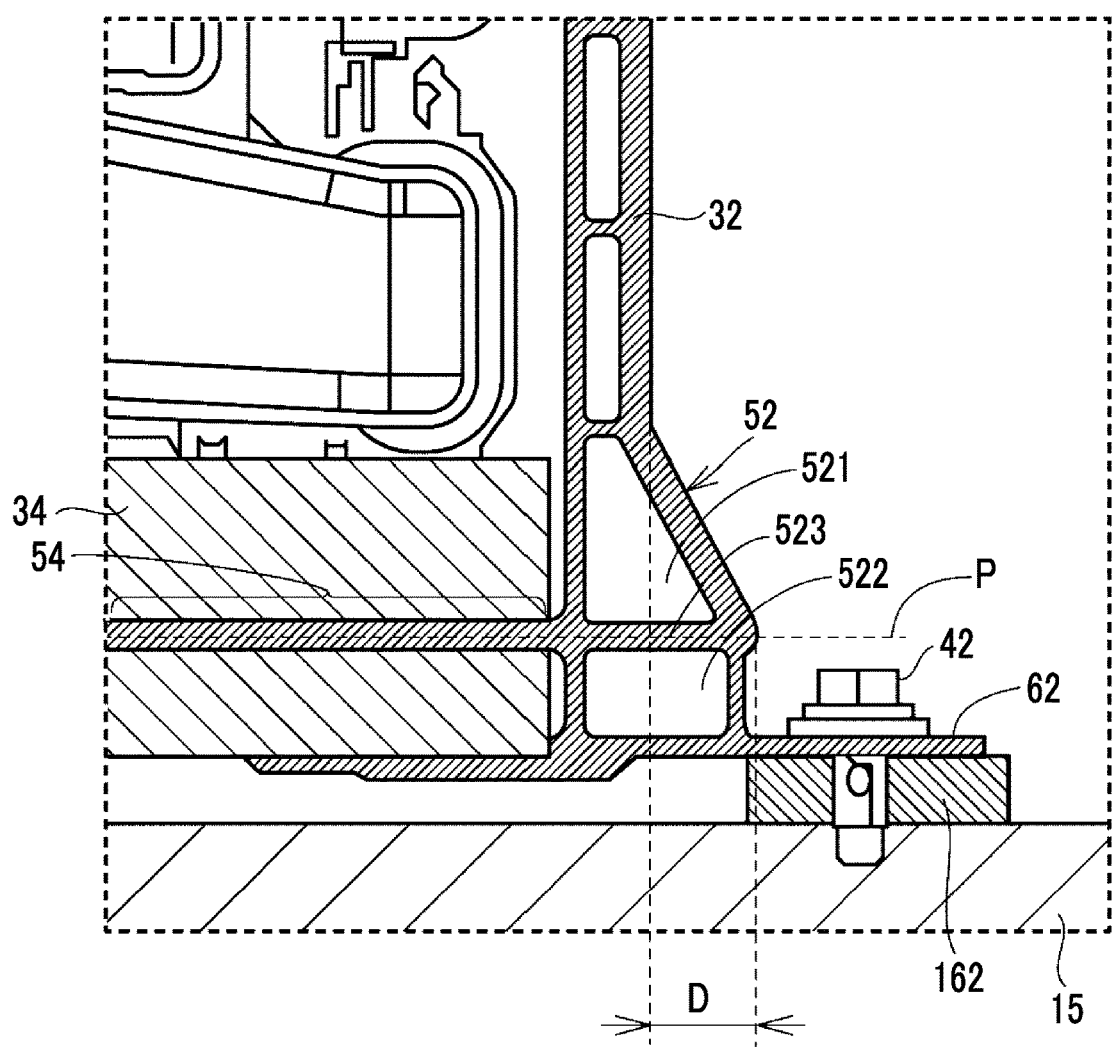
FIG. 5 is an enlarged view of a lower portion of a rear frame of the case shown in FIG. 3.

FIG. 5 is an enlarged view of a lower portion of the rear frame 32 of the battery case 30. Referring to FIGS. 3 and 5, protrusions 52 are provided in the lower portion of the rear frame 32. The battery case 30 further includes the flange 62 that is provided to fix the battery case 30 to the body of the vehicle 1 in the lower portion of the rear frame 32.

Each protrusion 52 protrudes toward the rear side of the vehicle 1 by an amount indicated by D from a body portion (a portion extending in the height direction of the vehicle 1) of the rear frame 32. The protrusion 52 includes a hollow portion 521, a hollow portion 522, and a wall 523 that divides the hollow portion 521 and the hollow portion 522. It is desirable that the wall 523 and the extension portion 54 are formed integrally so as to be connected to each other on the same horizontal plane (indicated by P).

Through-holes are formed in the flange 62. The bolts 42 pass through the through-holes and nuts are fastened to the bolts 42, whereby the rear frame 32 is fastened to the floor panel 15 through the mount 162. As shown in FIG. 2, the number of bolts 42 is, for example, two.

Figure 6:
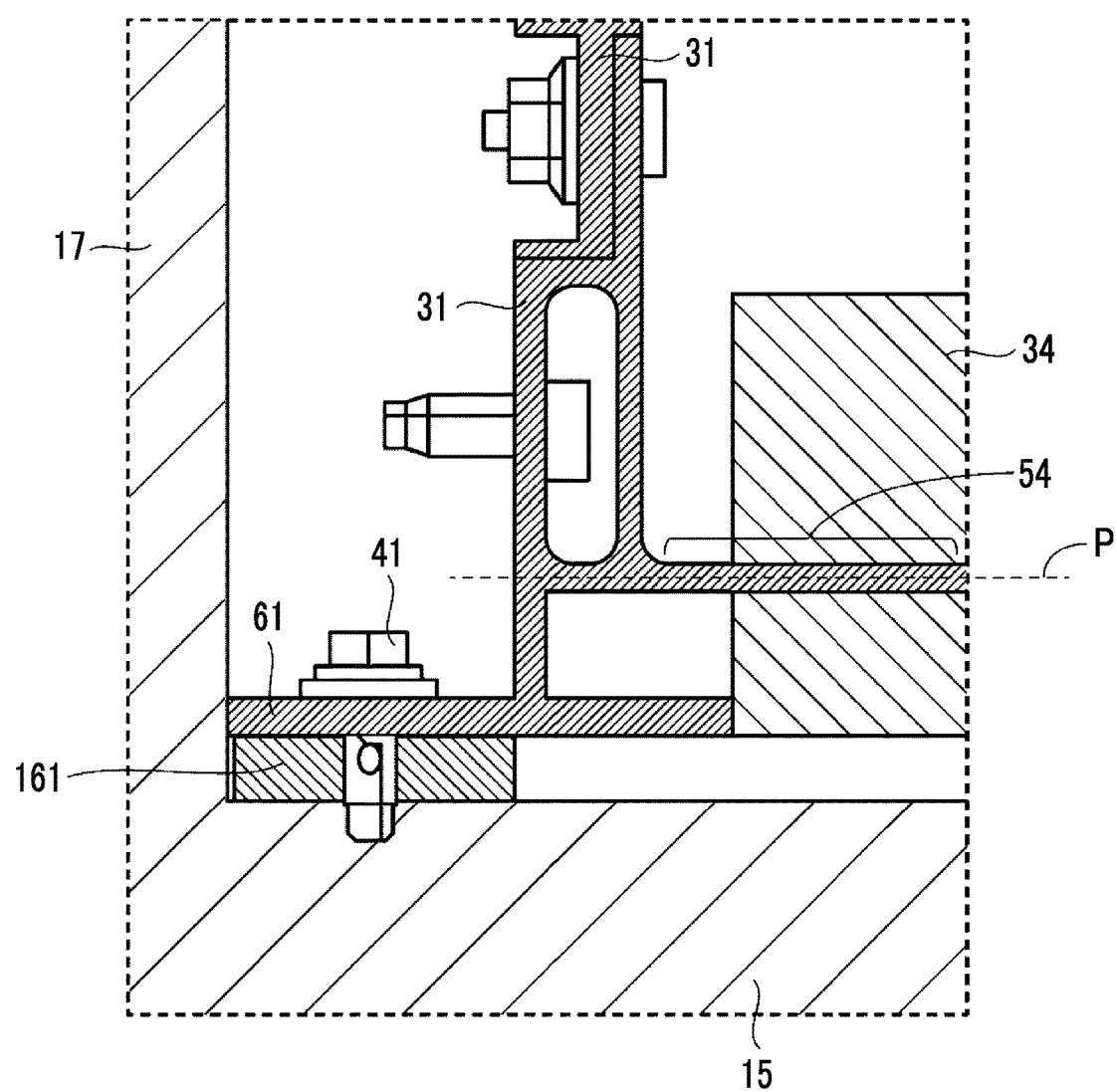
FIG. 6 is an enlarged view of a lower portion of a front frame of the case shown in FIG. 3.

FIG. 6 is an enlarged view of a lower portion of the front frame 31 of the battery case 30. Referring to FIGS. 3 and 6, the battery case 30 further includes the flange 61 that is provided to fix the battery case 30 to the body of the vehicle 1 in the lower portion of the front frame 31. The battery pack 10 is disposed such that a tip of the flange 61 is in contact with an erect wall portion 17 erected substantially vertically from the floor panel 15.

Through-holes are also formed in the flange 61. The bolts 41 pass through the through-holes and nuts are fastened to the bolt 41, whereby the front frame 31 is fastened to the floor panel 15 through the mount 161. As shown in FIG. 2, the number of bolts 41 is, for example, six. The flanges 61, 62 are an example of a "fixing portion" according to the present disclosure. The flange 61 and the front frame 31 may be formed separately and may be connected to each other by bolts or the like. The same applies to the flange 62 and the rear frame 32.

In the battery pack 10 configured as above, for example, in a case where a constituent part (in FIG. 3, indicated by S) of the vehicle 1 is physically deformed due to collision with another vehicle (not shown) from the rear side of the vehicle 1 and comes into contact with the battery pack 10, the protrusions 52 that protrude from the rear frame 32 among the constituent elements of the battery pack 10 first receive impact energy. Each protrusion 52 is provided with the hollow portions 521, 522. For this reason, the protrusions 52 function as a crushable zone locally formed in the battery pack 10 and absorb impact energy.

Impact energy (remaining impact energy) not completely absorbed by the protrusions 52 among impact energy received by the protrusions 52 is transmitted to the extension portions 53, 54 toward the front side of the vehicle 1. Impact energy transmitted to the extension portions 53, 54 is transmitted to the floor panel 15 and the erect wall portion 17 through the flange 61 formed in the front frame 31. That is, remaining impact energy finally escapes to the body (the floor panel 15 and the erect wall portion 17) of the vehicle 1. With this, it is possible to prevent damage to the structures inside the battery case 30 and to more reliably protect the battery modules 20.

In the embodiment, the protrusions 52 and the extension portions 53, 54 are provided so as to be connected to each other on the same horizontal plane P. For this reason, it is possible to make impact energy (impact energy not completely absorbed) received by the protrusions 52 be more efficiently transmitted to the extension portions 53, 54.

In the embodiment, the battery pack 10 is fixed to the body (the floor panel 15) in the lower portion of the battery pack 10. Both of the protrusions 52 and the extension portions 53, 54 are provided in the lower portion of the battery pack 10. That is, both of fixing of the battery pack 10 and absorption and transmission of impact energy are performed in the lower portion of the battery pack 10. With this, a moment for causing distortion of the battery case 30 at the time of application of impact energy is reduced and distortion (deflection or twist) of the battery case 30 hardly occurs compared to a configuration in which fixing of the battery pack 10 is performed in an upper portion of the battery pack 10 or a configuration in which the protrusions 52 and the extension portions 53, 54 are provided in the upper portion of the battery pack 10 and absorption and transmission of impact energy is performed in the upper portion of the battery pack 10. As a result, it is possible to more reliably protect the battery modules 20.

As shown in FIG. 2, the number of bolts 41 (=the number of through-holes; in FIG. 2, six) that are provided on the front side of the battery pack 10 and fix the front frame 31 to the floor panel 15 is greater than the number of bolts 42 (=the number of through-holes; in FIG. 2, two) that are provided on the rear side of the battery pack 10 and fix the rear frame 32 to the floor panel 15. With this, it is possible to secure a space for providing the protrusions 52 on the rear side of the battery pack 10 while firmly fixing the battery pack 10 to the floor panel 15 on the front side of the battery pack 10.

The embodiment disclosed herein is to be considered merely illustrative and not restrictive in all respects. The scope of the present disclosure is defined by the terms of the claims, rather than the above description of the embodiment, and is intended to include any modifications within the scope and meaning equivalent to the terms of the claims.

What is claimed is:

1. A battery pack that is mountable in a vehicle, the battery pack comprising:
   a plurality of battery modules; and
   a battery case that accommodates the battery modules, wherein:
   the battery case includes a first frame, a second frame provided across the battery modules from the first frame, and a connection portion that connects the first frame and the second frame; and
   the second frame is provided with a protrusion that protrudes in a direction from the first frame toward the second frame, wherein the protrusion and the connection portion are provided to be connected to each other on the same horizontal plane.

2. The battery pack according to claim 1, wherein:
   the protrusion is provided in a lower portion of the battery case; and the battery case further includes a fixing portion configured to fix the battery case to a body of the vehicle in the lower portion of the battery case.

3. The battery pack according to claim 2, wherein:
the fixing portion includes a flange that extends in a direction from the first frame toward the second frame in a lower portion of the second frame of the battery case; and
a lower end of the protrusion is connected to the flange.

4. The battery pack according to claim 2, wherein, in a state in which the battery pack is mounted on a rear side of the vehicle such that the first frame is disposed in front of the second frame in a front-rear direction of the vehicle, the first frame includes a front fixing portion disposed on a vehicle front side of the battery case and a rear fixing portion disposed on a vehicle rear side of the battery case, the front fixing portion is provided with a plurality of front through-holes for fastening the battery case to the body with bolts, the rear fixing portion is provided with a plurality of rear through-holes for fastening the battery case to the body with bolts, and the number of the front through-holes of the front fixing portion is greater than the number of the rear through-holes of the rear fixing portion of the vehicle.

5. The battery pack according to claim 1, wherein:
the battery case further includes a pair of side frames interposed between both end portions of the first frame and both end portions of the second frame; and
the connection portion is disposed outside the side frames.

* * * * *